United States Patent [19]

Herrgen

[11] 4,171,647

[45] Oct. 23, 1979

[54] TORQUE TESTING INSTRUMENT FOR TOOLS, ESPECIALLY SPANNERS

[75] Inventor: Rudolf H. Herrgen, Wermelskirchen, Fed. Rep. of Germany

[73] Assignee: Werkzeug-Union GmbH, Wuppertal, Fed. Rep. of Germany

[21] Appl. No.: 851,392

[22] Filed: Nov. 14, 1977

[30] Foreign Application Priority Data

Nov. 12, 1976 [DE] Fed. Rep. of Germany ....... 2651576

[51] Int. Cl.² .............................................. G01N 3/20
[52] U.S. Cl. ...................................... 73/854; 73/1 C
[58] Field of Search .................... 73/1 C, DIG. 4, 847, 73/849, 854, 853, 851

[56] References Cited

U.S. PATENT DOCUMENTS

| | | | |
|---|---|---|---|
| 3,011,332 | 12/1961 | Skidmore | 73/1 C |
| 3,269,175 | 8/1966 | Sprosty | 73/DIG. 4 |
| 3,456,485 | 7/1969 | Larson | 73/1 C |
| 3,582,691 | 6/1971 | Sonderegger et al. | 73/1 C |

FOREIGN PATENT DOCUMENTS

| | | | |
|---|---|---|---|
| 403098 | 12/1933 | United Kingdom | 73/DIG. 4 |
| 701907 | 1/1954 | United Kingdom | 73/1 C |

Primary Examiner—Charles A. Ruehl
Attorney, Agent, or Firm—Neil F. Markva

[57] ABSTRACT

A torque-testing instrument is disclosed for testing tools such as spanners, wrenches and the like. The instrument comprises a measuring assembly, a reading device and means for transmitting measured values from the measuring instrument to the reading device. The tool is fastened in the testing instrument and subjected to a torque effect. A load cell produces an electrical charge signal constituting measured values proportional to the torque effect being transmitted within the instrument. The load cell comprises a piezoelectric load sensing element electrically connected to an electronic amplifier for the reading device.

8 Claims, 2 Drawing Figures

TORQUE TESTING INSTRUMENT FOR TOOLS, ESPECIALLY SPANNERS

BACKGROUND OF THE INVENTION

This invention relates to a torque-testing instrument for tools. More particularly, the tool is fastened in a testing instrument and subjected to a torque effect. The torque applied to the tool is detected or picked up via a measuring instrument from which measured values are transmitted to a reading device, or the like, by means of transmission elements. Testing instruments of different kinds are used for testing the torque resistance of tools, such as spanners, wrenches and the like. Testing instruments having a spring dynamometer operable pneumatically or manually are known. Purely mechanically operating torque-testing instruments do not work with sufficient accuracy. Furthermore, the elasticity in the mechanical torque-testing instruments may grow weaker with use. Comparatively significant discrepancies in measurements occur. Consequently, these known instruments can give only a rough indication for the torque resistance of the tool being tested.

Other torque-testing instruments work on the principle of the application of a wire strain gauge. In this known type of instrument, a different wire strain gauge has to be applied for each torque value. The measuring ranges of the instrument are comparatively small. Different capsule-type dynamometers with corresponding wire strain gauges have to be applied at any given time for different measuring ranges. Interchanging of this nature is inconvenient and, furthermore, in itself, conceals sources of error.

Indicating instruments with scales and pointers are used with the known torque-testing instruments. It is extremely difficult to read the results from such indicating instruments. The readings from these instruments are also repeatedly inaccurate.

SUMMARY OF THE INVENTION

The torque-testing instrument, as described herein, works on the basis of the principle of piezoelectric measurement. Thus, the instrument provides reliable and positive indication of the torque being measured and guarantees a high accuracy of measurement along with universal applicability and simplicity of construction. The torque-testing instrument used for tools, such as spanners, wrenches and the like, includes the arrangement of a piezoelectric load sensing element, constituting a load cell connected to an electronic amplifier for the indicating device or devices.

In accordance with a further feature of this invention, the torque-testing instrument with the piezoelectric load sensing element is equipped with a unique measuring head assembly. The assembly includes, as a lever arm, a plate member rigidly connected with an intermediate plate disposed on a base plate. A tool holding fixture is provided at one end of the plate member and the piezoelectric load sensing element provided laterally of the plate member at the other end thereof. The load cell may be supported on a block on the base plate. The torque being measured is applied to the lever arm which in turn transfers the torque to the piezoelectric load sensing element. Consequently, only the stress introduced into the lever arm has an effect on the load cell. There is absolutely no question of motion.

In a specific embodiment, the lever arm plate member is secured to the base plate by way of a bearing. The attachment for the tool is interchangeably mounted in the plate member. Thus, tools with a large range of key widths may be fastened to the measuring head. The load cell may be held at the block of the base plate clamped between screw bolts.

A further feature of the invention is directed to a torque applying device for engaging and moving the free end of the tool being tested. The torque applying device is disposed on the base plate and laterally spaced from the measuring head. This device includes a sliding carriage with actuating mechanism and is movable transversely with respect to the measuring head. The sliding carriage may have a supporting plate for mounting the free end of the tool. The tool mounting means may include stops provided on the supporting plate for acting on the free end of the tool being tested. The stops may be in the form of plugs which are capable of being moved along the length of the supporting plate. Consequently, short and long tools can be engaged by the stop means at the free end of the tool.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
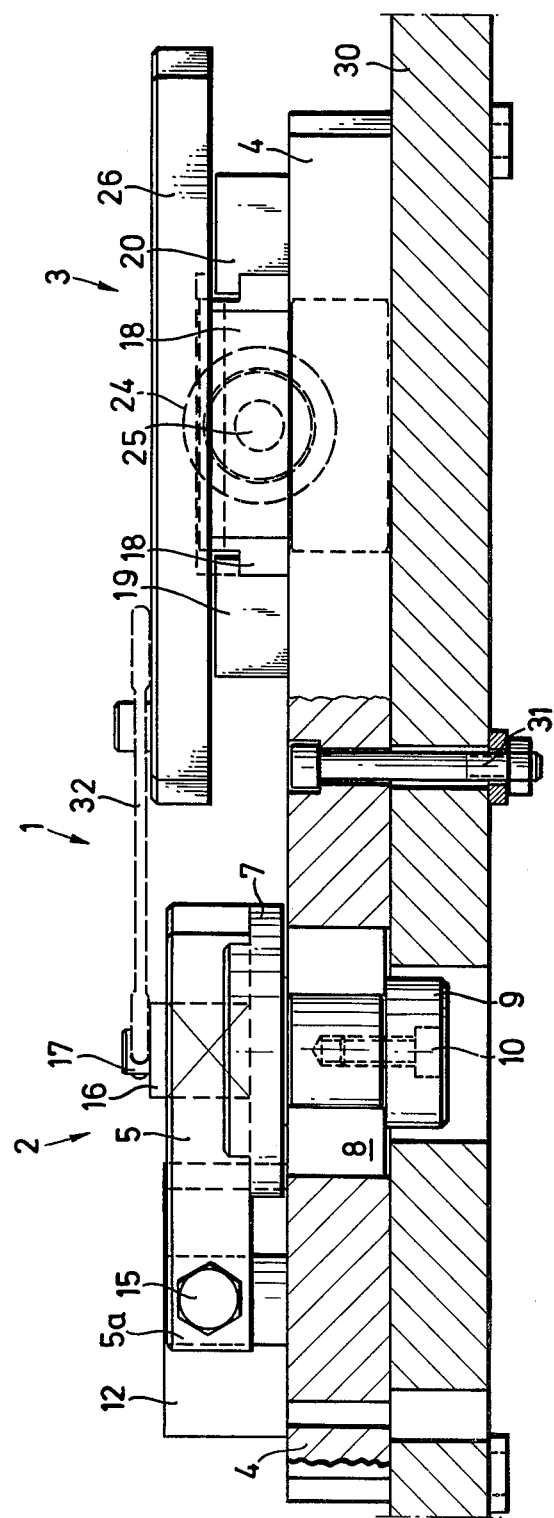
FIG. 1 is a diagrammatic elevational view partially in section of a torque-testing instrument made in accordance with this invention.
Figure 2:
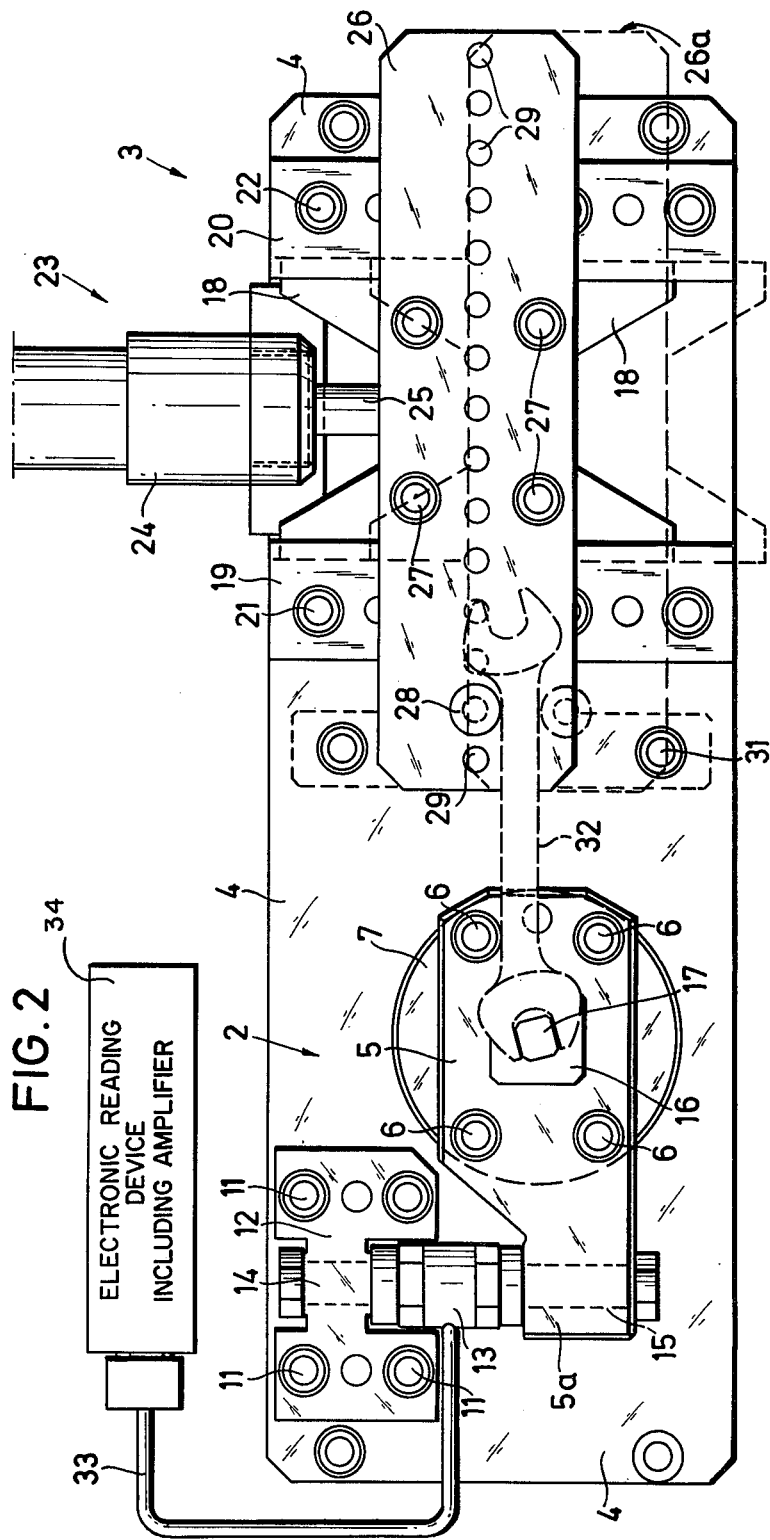
FIG. 2 is a plan view of the torque-testing instrument of FIG. 1.

The instrument, generally designated 1, is used for testing torque and comprises a measuring assembly including a measuring head 2 and a torque applying device 3, which are disposed on a common base plate 4. The torque applying device 3 is used on the tool to be tested. Measuring head 2 includes a plate member 5 which operates as a lever arm and is rigidly and immovably connected to intermediate plate 7 by the screws 6. The intermediate plate 7 is set into base plate 4 by a bearing 8. Thus, it is evident that intermediate plate 7 is mounted to rotate about a pivot point on the measuring head 2. The measuring head 2 also includes counterpressure plate 9 and clamping screw 10.

As a lever arm, plate membr 5 has a free end 5a supported on adjustment bolt 15. A block 12 is secured to base plate 4 with screws 11. A load cell 13 consists of a piezoelectric load sensing element and is mounted between the free end 5a and block 12. In this specific embodiment, the load cell 13 is supported between adjustment bolts 14 and 15. As is evident from the drawings, bolts 14 and 15 extend in a direction transverse to plate member 5 to transmit any torque effect force to the load cell. That is, load cell 13 is clamped between bolts 14 and 15 thereby being provided laterally of plate member 5 so that the piezoelectric load sensing element receives the torque effect force in a direction transverse to plate member 5 holding fixture 16 is interchangeably arranged in plate member 5. Holding fixture 16 includes a multi-sided projection 17 having predetermined dimensions when spanners are involved.

The torque applying device 3 is laterally displaced from the measuring head 2 of the base plate 4. Torque applying device 3 includes a carriage 18 slidingly supported between bars 19 and 20 which are secured to base plate 4 by screws 21 and 22. Sliding carriage 18 is acted upon by a driving device 23 which may be of hydraulic, pneumatic, hydropneumatic or mechanical construction. In this embodiment, driving device 23 includes a piston movably mounted in cylinder 24 and having a rod 25 which acts directly upon sliding carriage 18.

A supporting plate 26 is rigidly secured to sliding carriage 18 by screws 27. At least one stop 28, preferably in the form of a plug, is disposed on supporting plate 26. Plug 28 is capable of being moved along supporting plate 26, at any one of the locations of stop receiving means or bores 29 longitudinally disposed in series along supporting plate 26. That is, stop or plug 28 is inserted into one of the series of bores 29 in accordance with the length of the tool being tested. Sliding carriage 18 can be moved to such an extent that plug 28 can also engage the rear of the tool 32 as illustrated by the broken representation 26a. Screw bolts 31 fixedly secure base plate 4 to a table plate 30 of a support.

Torque applying device 3 is driven by a pressure medium or manually, e.g. by means of a spindle with a crank. Device 3 applies the torque to tool 32 which is to be measured by measuring head 2. Tool 32 is disposed between measuring head 2 and device 3, as shown, with the torque being transmitted from tool 32 to the measuring head 2. The transmitted torque acts on lever arm 5 which pivots about a pivot point on the measuring head 2 and thereby transmits the torque to the load cell 13. Piezoelectric load sensing element 13 delivers an electrical charge signal in conformity with or in direct relationship to the torque transmitted through the lever arm 5. The transmitted electrical charge signal is converted into a proportional output voltage and amplified in an amplifier (not shown) which is connected to load cell 13 by connection line 33. Thus, the transmitted electrical charge signal may be directly indicated and recorded as a corresponding physical value by means of electronic indicating or reading and recording device 34.

The torque-testing instrument as described herein, may also be used as a calibration instrument, e.g. for torque wrenches. Further, the described instrument may be used directly as a turning tool in the form of an electronically operating torque spanner.

ADVANTAGES OF THE INVENTION

A torque-testing instrument as described herein enables the measurement of torque with a very large torque range of nil to about 250 kpm, in one and the same instrument. The instrument is useful for practically all available sizes of spanners or wrenches. This broad range of measurement is continuous. The instrument itself requires very little floor space and can be easily employed. The working of the torque-testing instrument is independent of temperature. The reading off of the test results is made easier by the feasibility of an electronic representation. All measurements can be conducted on the instrument on the basis of the principle of piezoelectric measurement. A peak value of storage with representation is possible. The test instrument may be electrically connected with a digital readout or possibly linked to a graphic representation with the indicator. The torque-testing instrument is extremely robust and inexpensive to produce. Furthermore, it is durable, long-lasting, and economical.

While the torque-testing instrument for tools has been shown and described in detail, it is obvious that this invention is not be be considered as being limited to the exact form disclosed, and that changes in detail and construction may be made therein within the scope of the invention, without departing from the spirit thereof.

Having thus set forth and disclosed the nature of this invention, what is claimed is:

1. A torque testing instrument for tools such as spanners, wrenches and the like, said instrument being connectable to a reading device and comprising:
    (a) a measuring assembly and a means for transmitting measured values from the measuring assembly to said reading device,
    (b) means for holding a tool while being subjected to torque effect force,
    (c) load sensing means for producing an electrical charge signal constituting measured values proportional to the torque effect force being transmitted,
    (d) said load sensing means including a piezoelectric load sensing element,
    (e) said means for transmitting measured values including means for electrically connecting the load sensing element to an electronic amplifier for the reading device,
    (f) said measuring assembly including a measuring head having a holding fixture and a plate member which functions as a lever arm,
    (g) said plate member being rigidly connected with an intermediate member rotatably disposed on a base plate means, said intermediate member being mounted to rotate about a pivot point on the measuring head,
    (h) said means for holding including a holding fixture effective to hold the tool to be tested and being located at one end of the plate member which transmits said torque effect force to said piezoelectric sensing element,
    (i) said piezoelectric sensing element being provided laterally of the plate member at the other end thereof to receive said torque effect force in a direction transverse to said plate member,
    (j) said load sensing means being supported on a block secured to said base plate means.

2. An instrument as defined in claim 1 wherein said holding fixture is interchangeably mounted with said lever arm plate member.

3. An instrument as defined in claim 1 wherein said load sensing element is held clamped between screw bolts,
one screw bolt being located on said block and the other screw bolt being located on said plate member.

4. An instrument as defined in claim 1 wherein said measuring assembly includes said base plate means, a torque applying means and said measuring head,
said measuring head and torque applying means being disposed on said base plate means and laterally spaced with respect to each other,
said torque applying means being effective to move the free end of the tool being tested,
said torque applying means including a sliding carraige means that is movable transversely with respect to the measuring head and cooperates with an actuating mechanism.

5. A torque testing instrument for tools such as spanners, wrenches and the like, said instrument being connectable to a reading device and comprising:

(a) a measuring assembly and a means for transmitting measured values from the measuring assembly to said reading device,
(b) means for holding a tool while being subjected to torque effect force,
(c) load sensing means for producing an electrical charge signal constituting measured values proportional to the torque effect force being transmitted,
(d) said load sensing means including a piezoelectric load sensing element,
(e) said means for transmitting measured values including means for electrically connecting the load sensing element to an electronic amplifier for the reading device,
(f) said measuring assembly including base plate means, a torque applying means and a measuring head,
(g) said measuring head and torque applying means being disposed on said base plate means and laterally spaced with respect to each other,
(h) said torque applying means being effective to engage and move the free end of the tool being tested, and
(i) said torque applying means including a sliding carriage means that is movable transversely with respect to the measuring head and cooperates with an actuating mechanism,
(j) said measuring head having a pivot point around which point the tool pivots when moved by said torque applying means.

6. An instrument as defined in claim 5 wherein said sliding carriage means includes a supporting plate having a stop means for engaging said free end of said tool.

7. An instrument as defined in claim 6 wherein said stop means includes a plug member that is removably mounted along the length of the supporting plate.

8. An instrument as defined in claim 6 wherein said stop means includes stop receiving means extending along the length of the supporting plate, said stop means further including plug means removably mounted in said stop receiving means.

* * * * *

UNITED STATES PATENT OFFICE
CERTIFICATE OF CORRECTION

Patent No. 4,171,647　　　　　　　　Dated October 23, 1979

Inventor(s) Rudolf H. Herrgen

It is certified that error appears in the above-identified patent and that said Letters Patent are hereby corrected as shown below:

Page 1, correct the name of the Assignee to:

Werkzeug-Union GmbH - DWU - .

Signed and Sealed this

Twenty-sixth Day of February 1980

[SEAL]

Attest:

SIDNEY A. DIAMOND

Attesting Officer

Commissioner of Patents and Trademarks